(12) United States Patent
Hofschulte et al.

(10) Patent No.: US 11,813,967 B2
(45) Date of Patent: *Nov. 14, 2023

(54) LINEAR DRIVE, LONGITUDINAL ADJUSTMENT UNIT OF A SEAT, AND MOTOR VEHICLE

(71) Applicant: IMS GEAR SE & CO. KGAA, Donaueschingen (DE)

(72) Inventors: Wolfram Hofschulte, Bonndorf (DE); Jens Fechler, Hüfingen (DE); Marco Werschler, Radolfzell (DE); Marcel Mittelbach, Schluchsee (DE); Nikolai Benz, Stegen (DE); Stephan Oberle, Villingen (DE)

(73) Assignee: IMS GEAR SE & CO. KGAA, Donaueschingen (DE)

( * ) Notice: Subject to any disclaimer, the term of this patent is extended or adjusted under 35 U.S.C. 154(b) by 34 days.

This patent is subject to a terminal disclaimer.

(21) Appl. No.: 17/616,370

(22) PCT Filed: May 28, 2020

(86) PCT No.: PCT/EP2020/064928
§ 371 (c)(1),
(2) Date: Dec. 3, 2021

(87) PCT Pub. No.: WO2020/245036
PCT Pub. Date: Dec. 10, 2020

(65) Prior Publication Data
US 2022/0325784 A1    Oct. 13, 2022

(30) Foreign Application Priority Data
Jun. 4, 2019    (EP) .................................. 19178264

(51) Int. Cl.
*B60N 2/06*    (2006.01)
*F16H 37/12*    (2006.01)
(Continued)

(52) U.S. Cl.
CPC ............. *B60N 2/067* (2013.01); *F16H 19/04* (2013.01); *F16H 25/12* (2013.01); *F16H 31/007* (2013.01); *F16H 37/124* (2013.01); *F16H 55/08* (2013.01)

(58) Field of Classification Search
CPC ....... B60N 2/067; F16H 37/124; F16H 55/08; F16H 19/04; F16H 25/12; F16H 31/007
See application file for complete search history.

(56) References Cited

U.S. PATENT DOCUMENTS

2022/0234478 A1* 7/2022 Werschler .............. B60N 2/067
2022/0325784 A1* 10/2022 Hofschulte ............. F16H 25/18

FOREIGN PATENT DOCUMENTS

DE    19932046 A1    1/2001
EP    0612935 A1    8/1994
(Continued)

OTHER PUBLICATIONS

EP Search Report dated Dec. 3, 2019, in corresponding application EP 19178264.8.

*Primary Examiner* — Terence Boes
(74) *Attorney, Agent, or Firm* — Nath, Goldberg & Meyer; Jerald L. Meyer (57) ABSTRACT

The present invention relates to a linear drive (1), comprising a drive shaft (10) arranged along a longitudinal axis (X), at least two propulsion teeth (20), and at least one rack (30) having a plurality of teeth (31), wherein the propulsion teeth (20) can move in a stroke transversely to the longitudinal axis (X) and are drivingly coupled to the drive shaft (10) in such a manner that the at least two propulsion teeth (20)

(Continued)

perform at least one cyclical stroke movement (21) in the course of one rotation (φ) of the drive shaft (10) and enter and exit the at least one rack (30) to generate a propulsion in the longitudinal axis (X), and wherein the cyclical stroke movement (21) of the at least two propulsion teeth (20) takes place with a phase shift (Δφ). In addition, the present invention relates to a longitudinal adjustment unit and to a motor vehicle having such a longitudinal adjustment unit.

19 Claims, 6 Drawing Sheets

(51) Int. Cl.
*F16H 31/00* (2006.01)
*F16H 25/12* (2006.01)
*F16H 19/04* (2006.01)
*F16H 55/08* (2006.01)

(56) References Cited

FOREIGN PATENT DOCUMENTS

| | | |
|---|---|---|
| EP | 2541098 A1 | 1/2013 |
| WO | 2005/032878 A1 | 4/2005 |
| WO | 2008/028540 A1 | 3/2008 |

* cited by examiner

LINEAR DRIVE, LONGITUDINAL ADJUSTMENT UNIT OF A SEAT, AND MOTOR VEHICLE

This is a National Phase Application filed under 35 U.S.C. 371 as a national stage of PCT/EP2020/064928, filed May 28, 2020, an application claiming the benefit of European Application No. 19178264.8 filed Jun. 4, 2019, the content of each of which is hereby incorporated by reference in its entirety.

The present invention relates to a linear drive having the features of claim 1, to a longitudinal adjustment unit for a seat having the features of claim 18, and to a motor vehicle having the features of claim 19.

Linear drives are known from the prior art in various designs and are commonly used as longitudinal adjustment units for adjusting the position of a seat in motor vehicles. Longitudinal adjustment units typically interact with a lower rail fixed on a chassis and an upper rail arranged within said lower rail, it being possible to drive the upper rail by the longitudinal adjustment unit in a motorized manner and said rail being coupled to the seat. The adjustment of the upper rail by means of the longitudinal adjustment unit is typically carried out in the prior art by means of a spindle which is arranged within the upper rail and is supported in each case at its first end and second end.

Longitudinal adjustment units of this type are known, for example, from DE 36 40 197 A1, DE 42 08 948 C2, DE 196 42 655 C2, DE 198 15 283 A1, DE 10 2004 013 009 A1, and DE 10 2006 052 936 A1.

Due to the high requirements for a linear drive which, in addition to the adjustment function as a longitudinal adjustment unit, must also ensure accident safety, such linear drives have different types of design requiring different production methods and processes. It has been shown that a play-free linear movement can be realized only with great effort and that breaking loads can be adapted only with great effort.

This is where the present invention begins.

The object of the invention is to propose an improved linear drive which eliminates in an expedient manner the disadvantages known from the prior art. Furthermore, a linear drive with a particularly compact design is to be specified, which enables an almost play-free linear movement at the same time as a variable and adaptable breaking load. In addition, it is intended to be possible to realize a high adjustment speed using the linear drive according to the invention.

These objects are achieved by a linear drive having the features of claim 1, a longitudinal adjustment unit having the features of claim 18, and a motor vehicle having the features of claim 19.

Further advantageous embodiments of the invention are specified in the dependent claims.

The linear drive according to the invention having the features of claim 1 comprises a drive shaft which is rotatably arranged along a longitudinal axis. In addition, the linear drive comprises at least two propulsion teeth and at least one rack having a plurality of teeth, wherein the at least two propulsion teeth can move in a stroke transversely to the longitudinal axis and are drivingly coupled to the drive shaft in such a manner that the at least two propulsion teeth can perform at least one cyclical stroke movement in the course of one rotation of the drive shaft and can enter and exit the rack, in other words each enter and exit a tooth space between two teeth of the rack, to generate a propulsion in the longitudinal axis. According to the invention, the cyclical stroke movement of the at least two propulsion teeth takes place with a phase shift, a phase shift being understood here and in the following to mean at least two propulsion teeth entering and exiting the rack at different angles of rotation of the drive shaft.

Furthermore, here and in the following, a cyclical stroke movement is understood to mean a sequence of movements of the particular propulsion tooth, in which the propulsion tooth enters the rack once from a starting point and completely exits the rack once and returns to the starting point and vice versa. Each propulsion tooth can go through one or more complete periods or cycles during one rotation of the drive shaft, the number of periods or cycles always being an integer.

When each propulsion tooth enters the rack, the teeth and the propulsion teeth come into operative contact, resulting in propulsion in the longitudinal axis. For this purpose, each propulsion tooth enters the rack or the tooth space between two teeth, the propulsion tooth and the tooth of the rack coming into operative contact at so-called friction surfaces, resulting in propulsion. To this end, it is necessary for at least the teeth and/or the propulsion teeth to have friction surfaces that are formed in the manner of a wedge surface.

According to an advantageous embodiment of the present invention, the at least two propulsion teeth are arranged at a first distance in the longitudinal axis and the teeth of the rack are arranged at a second distance along the longitudinal axis, the first distance being smaller than the second distance or the second distance being smaller than the first distance. In other words, the first distances between the propulsion teeth and the second distances between the teeth of the at least one rack must be different.

The first distance and the second distance are each based on the geometric center of each propulsion tooth or of the tooth of the rack and are measured in parallel with the longitudinal axis. By virtue of dimensioning the first distance and the second distance differently, the respective propulsion teeth are positioned in different relative positions to the teeth of the rack during a cyclical movement of the at least two propulsion teeth with a phase shift.

It has also proven to be advantageous if each propulsion tooth and/or the tooth of the rack are or is rectangular, triangular, involuted, or sinusoidal. A triangular or sinusoidal tooth shape is preferred. Further preferably, the teeth of the rack and/or the propulsion teeth are arranged equidistantly in parallel with the longitudinal axis. In the event that more than two propulsion teeth are provided, it is also preferred if these propulsion teeth are arranged in parallel with the longitudinal axis in at least one row at equidistant spacings.

It has also proven to be advantageous if each propulsion tooth and/or the teeth of the rack are symmetrical. By designing each propulsion tooth and/or tooth of the rack to be symmetrical, the same adjustment speeds can be achieved in both propulsion directions along the longitudinal axis, provided that the rotational speed of the drive shaft remains constant.

Furthermore, it has proven to be advantageous if the at least two propulsion teeth and the teeth of the rack have a corresponding tooth shape. A corresponding tooth shape is to be understood to mean that, upon fully entering the tooth space between two teeth of the rack, each propulsion tooth, together with its friction surface facing the teeth of the rack, lies flat against the friction surfaces of the teeth of the rack.

According to an advantageous embodiment of the linear drive according to the invention, the phase shift of the cyclical stroke movement of the at least two propulsion teeth in relation to a rotation φ of the drive shaft is at least $\frac{1}{256}φ$, further preferably at least $\frac{1}{128}φ$, $\frac{1}{64}φ$, $\frac{1}{32}φ$, $\frac{1}{16}φ$, or $\frac{1}{8}φ$ and is preferably less than or equal to ½φ. The phase shift is preferably less than ½φ, in particular ⅓φ or ¼φ.

It may be advantageous if the mathematical reciprocal of the particular fraction (1/n) of the phase shift predetermines the minimum number k of propulsion teeth to be provided, specifically k=(n/i)−1, where a number i is the number of cyclical stroke movements of a propulsion tooth during one rotation φ of the drive shaft. For example, preferably at least 2 propulsion teeth are to be provided if the phase shift between the propulsion teeth is ⅓φ and the propulsion tooth performs a complete stroke movement per rotation.

In addition, it has proven to be advantageous if the drive shaft is designed as a crankshaft or camshaft and has at least one guide means which predetermines the cyclical stroke movement during the rotation of the drive shaft. Furthermore, it is preferred if at least two guide means are provided, which are arranged at a distance from one another in the longitudinal axis, each of the at least two guide means being associated with at least one propulsion tooth.

In accordance with a further advantageous embodiment of the present invention, the at least two guide means are arranged at an angle so as to be rotated about the longitudinal axis, the angle predetermining the phase shift between the cyclical stroke movements of the at least two propulsion teeth.

According to a further advantageous embodiment of the present invention, the guide means have a contact surface, it being possible for the contact surface to have a flat, concave, convex, sinusoidal, or zigzag-shaped course in the longitudinal axis. It is particularly preferred if the contact surface of the guide means brings about a form fit with the propulsion tooth or the corresponding contact surface thereof, as a result of which axial forces can be transmitted from each propulsion tooth to the drive shaft.

The at least one guide means can comprise a camshaft disk, the camshaft disk being further preferably designed as an eccentric, ellipse, polygon, tetragon, pentagon, or hexagon, or from a combination of these shapes, in cross section. The camshaft disk can therefore have one or more maxima of the radius over the circumference. An eccentric typically has a maximum, as a result of which the propulsion tooth, which is in operative connection with the camshaft disk, performs a complete cyclical stroke movement during one rotation of the drive shaft. A number i of maxima indicates the number of complete cyclical stroke movements in the course of one rotation of the drive shaft and, in addition, the number i can be used for determining the minimum number n of propulsion teeth to be provided.

Furthermore, it has proven to be advantageous if each propulsion tooth is pressed against the drive shaft by spring action and/or is drivingly coupled to the drive shaft by means of a connecting rod.

According to a further advantageous equipment of the present invention, each propulsion tooth can be drivingly coupled to the drive shaft via a sliding contact or a single or multiple roller contact. It is also preferred if each propulsion tooth is coupled to the drive shaft by means of a single roller contact, a double roller contact, or a quadruple roller contact. The contact surface of the propulsion tooth or the contact surface of the drive shafts can roll on at least one contact roller of each roller contact, as a result of which friction losses and wear at each contact surface can be reduced.

According to a further embodiment of the present invention, the at least two propulsion teeth can be arranged in a row along an axis which extends parallel to the longitudinal axis.

In particular, it is preferred if at least two rows of propulsion teeth are arranged around the longitudinal axis, it being possible to associate with each row at least one rack into which the respective propulsion teeth can enter and exit to generate a propulsion.

According to a further advantageous embodiment of the present linear drive according to the invention, a carriage is provided in which the at least two propulsion teeth and the drive shaft are mounted. The at least two propulsion teeth are preferably held transversely to the longitudinal axis in the manner of a slide bearing, as a result of which the propulsion generated by the at least two propulsion teeth can be transmitted to the carriage. The carriage can be formed of one or more parts and have means by which it is held so as to be linearly movable with respect to the at least one rack.

According to a development of the linear drive, a drive is provided. The drive is preferably an electric motor by means of which the drive shaft can be driven.

Furthermore, it is advantageous if a transmission is arranged between the drive and the drive shaft, it being possible for a planetary gearset to be arranged particularly preferably between the drive and the drive shaft.

The drive and/or the transmission can be arranged in the carriage according to an embodiment of the linear drive. The drive in the carriage can be supplied with energy and/or with control signals via a drag chain with corresponding electrical lines.

In addition, the present invention relates to a longitudinal adjustment unit having a linear drive according to the invention.

Another aspect of the present invention relates to a motor vehicle having at least one such linear drive according to the invention.

An exemplary embodiment according to the invention as well as developments of the present invention are described in detail below with reference to the accompanying drawings. In the drawings:

FIG. 10a-e show schematic representations of the cross section of the camshaft disks;

FIG. 11a-b show schematic representations of contact rollers by means of which the cyclical stroke movement of the propulsion teeth is predetermined during one rotation of the drive shaft;

FIG. 12a-e show schematic representations of different configurations of contact surfaces of the guide means; and FIG. 13a-b show schematic representations of different configurations of the teeth of the rack.

Identical or functionally identical components are identified below with the same reference symbols. For the sake of clarity, not all parts that are identical or functionally identical in the individual Figures are provided with a reference number.

Figure 1:
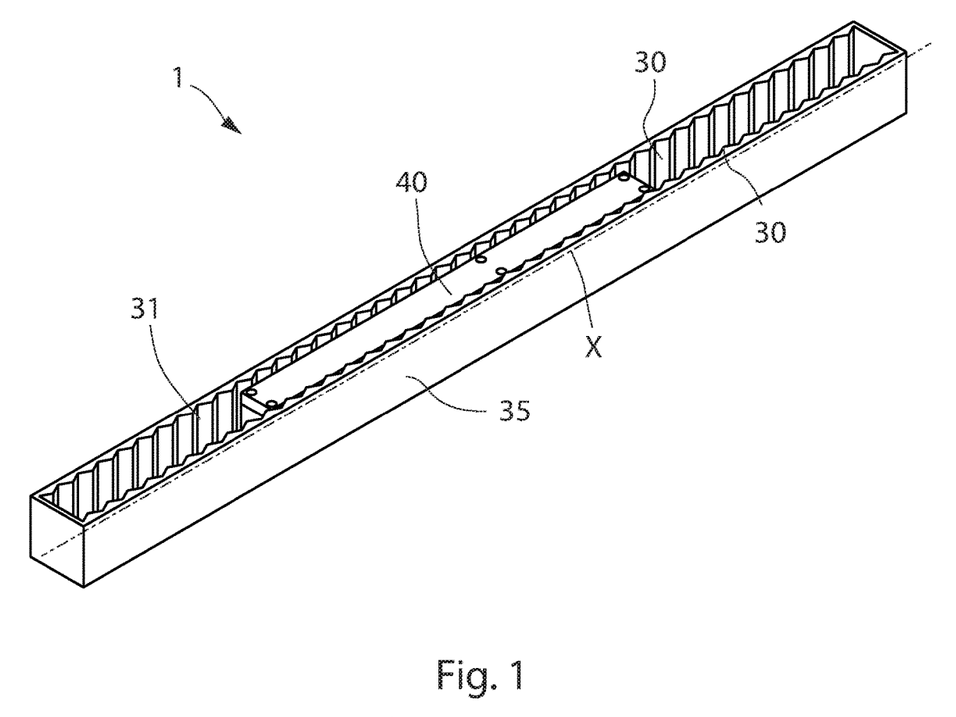
FIG. 1 shows a perspective representation of a linear drive according to the invention, comprising a carriage arranged in a rack housing having at least two propulsion teeth which are drivingly coupled to a drive shaft and which, during a rotation of the drive shaft, enter at least one rack of the rack housing in a cyclical stroke movement to generate a propulsion.

FIG. 1 shows a linear drive 1 according to the invention comprising a rack housing 35 and a carriage 40 which is held so as to be movably mounted along a longitudinal axis X between two racks 30. The linear drive 1 can be used in a longitudinal adjustment unit 2 (not shown) for adjusting a seat (not shown) in a motor vehicle 3 (not shown).

As in the illustrated exemplary embodiment, the rack housing 35 can be designed in the shape of a cuboid and enclose—at least partially—a space 38. One of the racks 30 is arranged on each of two diametrical sides facing the space 38, each rack being formed from a large number of teeth 31 arranged preferably equidistantly along the longitudinal axis X. A corresponding tooth space 32 is formed between every two teeth 31.

The rack housing 35 can be designed in such a way that it forms a stop in the longitudinal axis X in a first end region and in a second end region, by means of which stop the maximum movement distance of the carriage 40 within the space 38 is predetermined.

In the illustrated exemplary embodiment, the teeth 31 of the two racks 30 are identical, but the teeth 31 of the racks 30 can have different tooth shapes as well as different distances A2.

Figure 2:
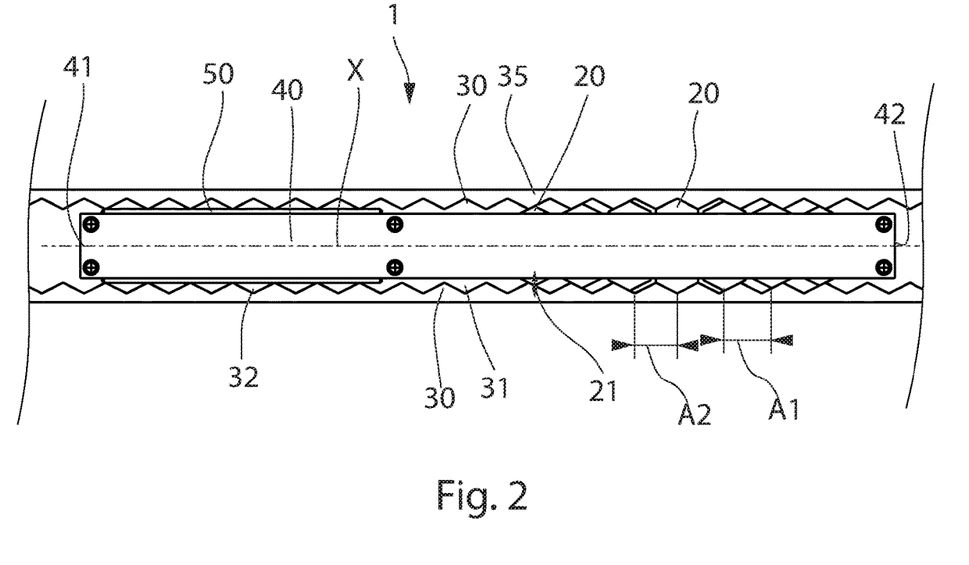
FIG. 2 shows a top view of the linear drive according to the invention according to FIG. 1.

As shown in FIG. 2, each distance A2 is measured in relation to the geometric center of the particular tooth 31. In the case of symmetrical teeth 31, a tooth tip is typically formed in the geometric center, from which two symmetrical tooth flanks extend as friction surfaces 36. In the illustrated exemplary embodiment, the two flanks enclose an angle of approximately 135°, the flanks preferably enclosing an angle of less than or equal to 180° and greater than 30°.

Figure 4:
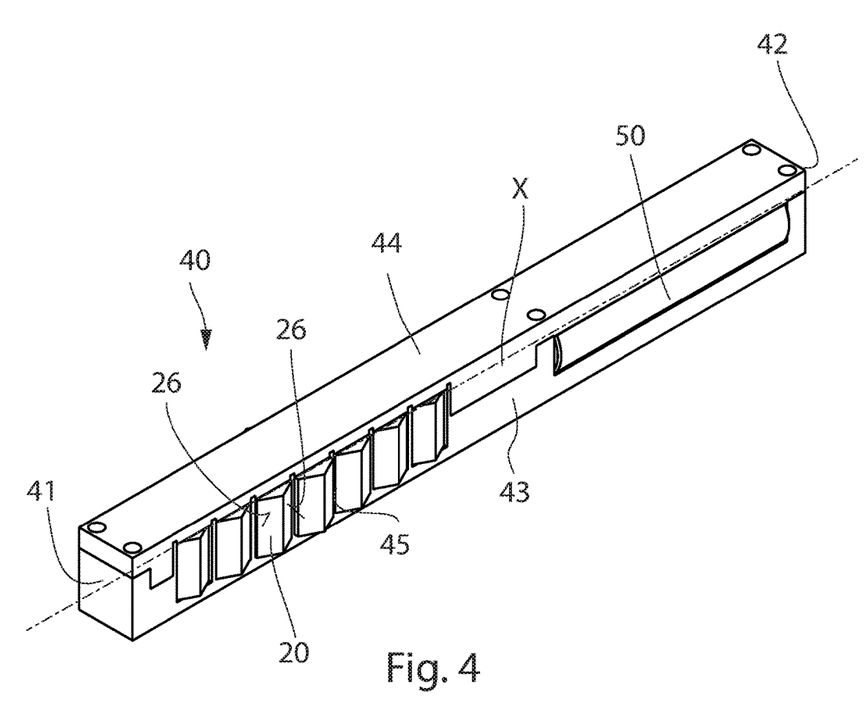
FIG. 4 shows a perspective and detailed representation of the carriage according to FIG. 3.
Figure 5:
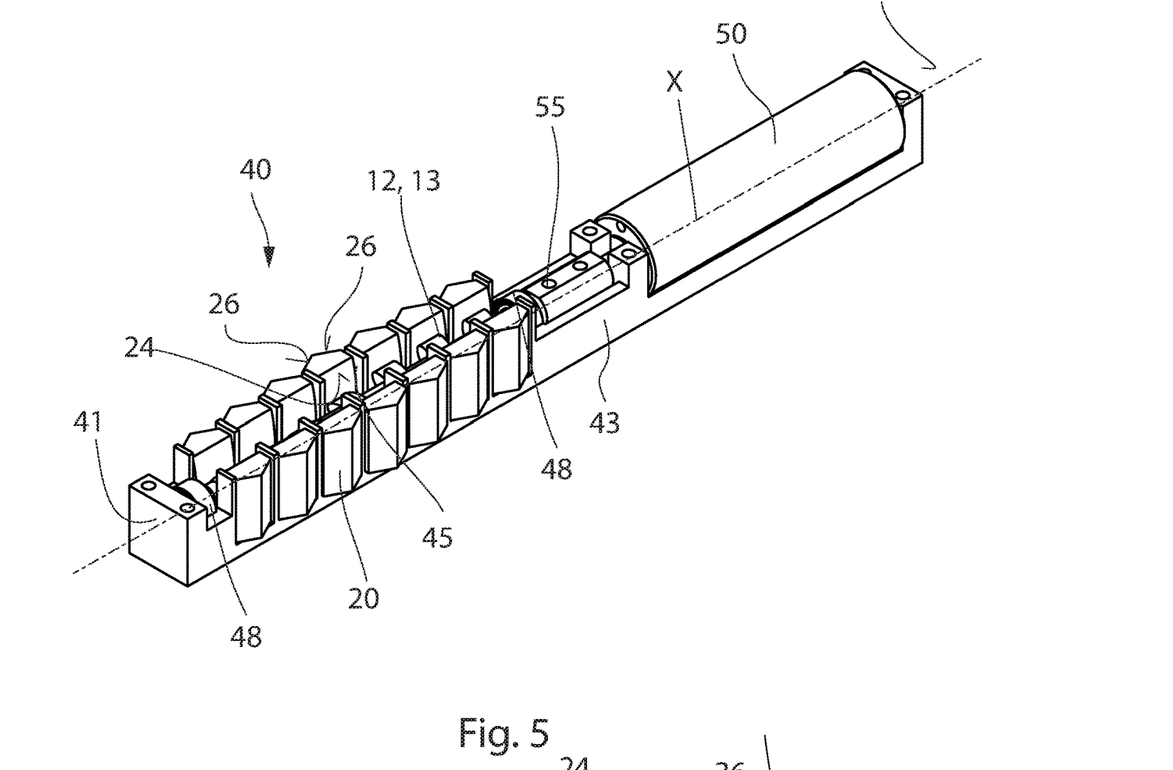
FIG. 5 shows a detailed view of the components of the carriage in the perspective according to FIG. 4.

As shown in FIG. 4, the carriage 40 comprises a two-part housing formed from a first housing part 43 and a second housing part 44. The housing comprises a first end region 41 and a second end region 42 which can interact with the rack housing 35 as an end stop.

Figure 3:
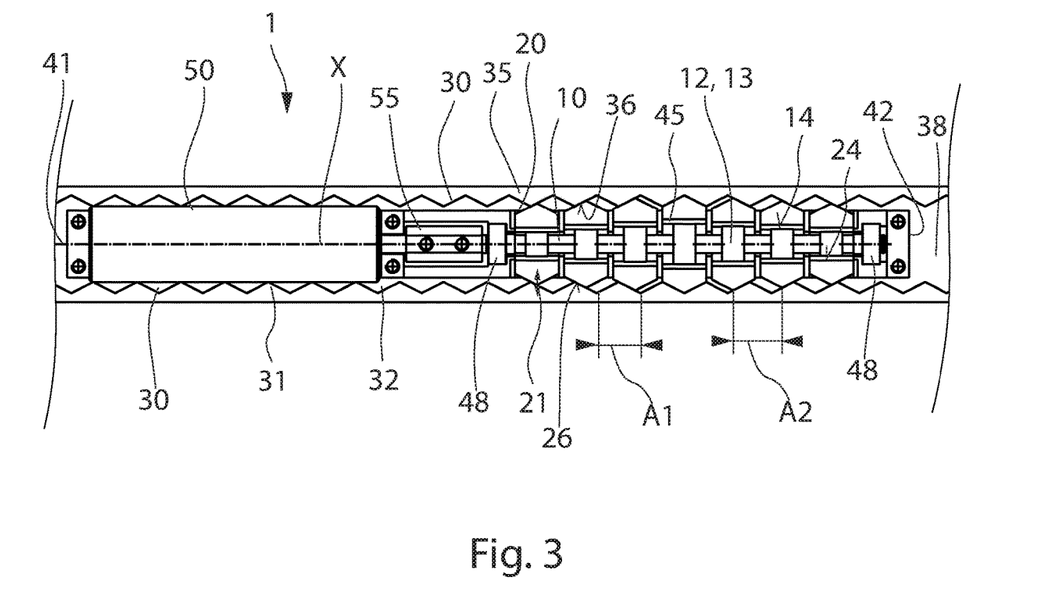
FIG. 3 shows a top view according to FIG. 1, the components in the carriage being visible.

FIG. 3 shows that a drive shaft 10 is arranged in the housing of the carriage 40 coaxially with the longitudinal axis X and is held so as to be rotatably mounted in the longitudinal axis X by means of bearings 48. The drive shaft 10 can be coupled to a drive 50 by means of a transmission 55, as a result of which the drive 50 can cause the drive shaft 10 to rotate about the longitudinal axis X.

The drive 50 can preferably be an electric drive and further preferably be coupled to the drive shaft 10 by means of the transmission 55, which is designed as a planetary gearset. The transmission 55 can step up or step down a rotational speed of the drive 50.

The drive shaft 10 has a plurality of guide means 12 which are arranged at a distance from one another between the two bearings 48. The guide means 12 are each arranged in a plane orthogonal to the longitudinal axis X and can—as will be described in detail below—have an eccentric, eccentric-shaped, elliptical, or polygonal configuration. The drive shaft 10 forms a type of camshaft and the guide means 12 are formed by camshaft disks 13.

Figure 6:
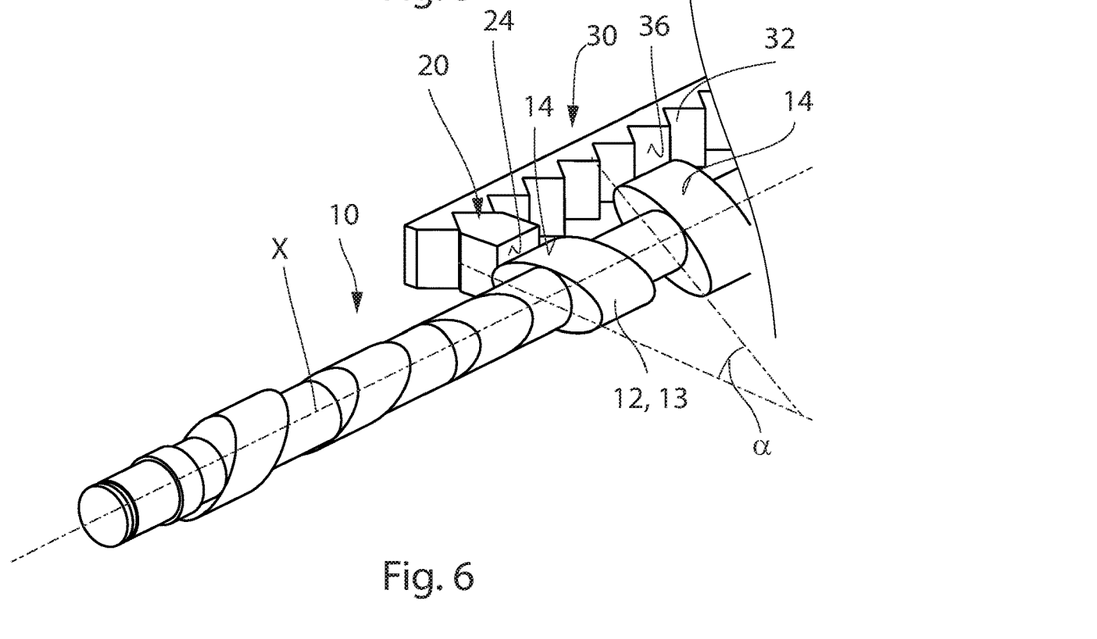
FIG. 6 shows a simplified representation of the drive shaft of the propulsion tooth and a rack.
Figure 9:
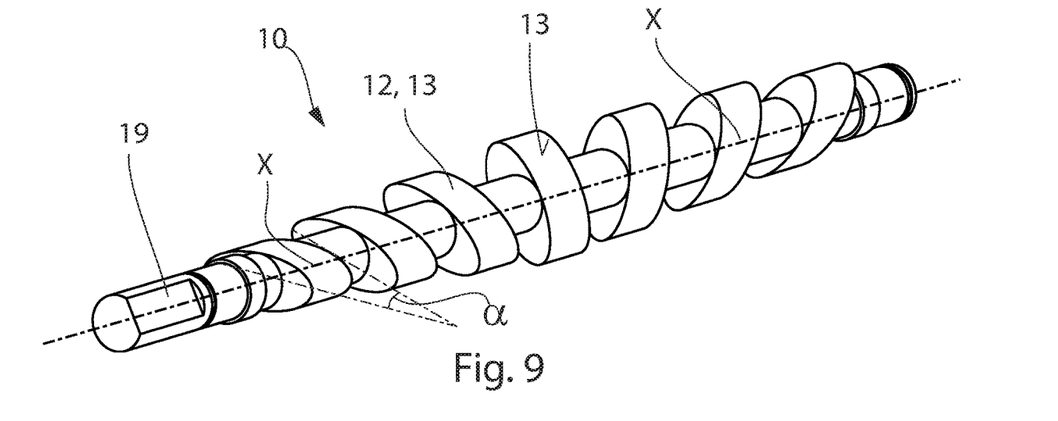
FIG. 9 shows an enlarged perspective representation of the drive shaft, in which it is apparent that the drive shaft is formed as a camshaft along a longitudinal axis and has a plurality of camshaft disks by means of which the cyclical stroke movement of the propulsion teeth is predetermined during one rotation of the drive shaft.
Figure 10:
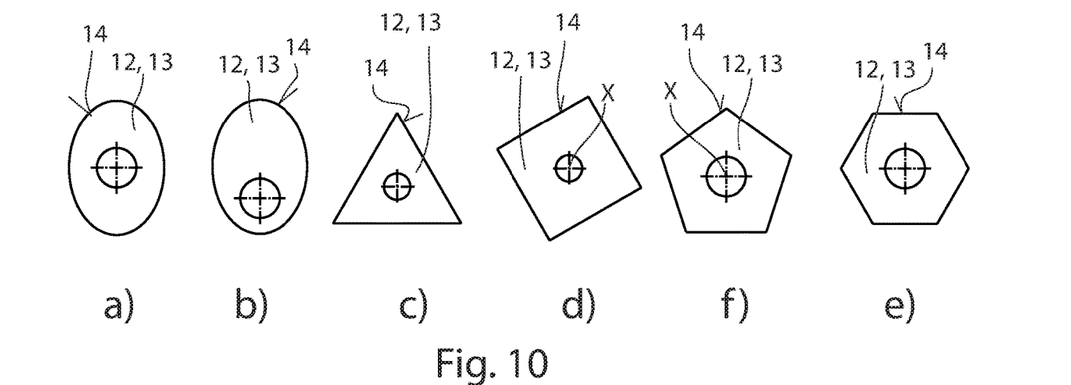

As can be seen in particular from FIGS. 6 and 9, the guide means 12 are arranged in a rotated manner along the longitudinal axis X, in each case at an angle α with respect to one another, and, in the present exemplary embodiment, the ellipse-shaped guide means 12 or the camshaft disks 13 are arranged so as to be rotated about the longitudinal axis X by the angle α=22.5° in each case.

Further in relation to FIG. 3, it can be seen that a plurality of guide recesses 45 are each arranged in the housing and arranged transversely to the longitudinal axis X in each case in the center and on diametrical sides to the guide means 12 or the camshaft disks 13.

A propulsion tooth 20 is inserted into the relevant guide recess 45, can be moved in the guide recess 45, and, as indicated by the double arrow, can perform a stroke movement 21 which extends radially or as a secant with respect to the longitudinal axis X.

Two rows of seven propulsion teeth 20 each are arranged around the drive shaft 10 symmetrically to the longitudinal axis X. The rows are aligned in parallel with the longitudinal axis X. The guide recess 45 forms a bearing for the propulsion tooth 20 in each case, as a result of which the propulsion tooth 20 is mounted so as to lift easily transversely to the longitudinal axis X and can enter and exit one of the tooth spaces 32 of the rack 30 through the guide recess 45.

In the exited state, each propulsion tooth 20 can be guided along the longitudinal axis X over a tooth tip of a tooth 31 of the rack.

Each propulsion tooth 20 can preferably be adapted to the shape of the teeth 31 of the rack 30, as a result of which the tooth flanks of the propulsion tooth 20 lie flat against the flanks of the teeth 31 when the propulsion tooth 20 has fully entered the tooth space 32. The width of each propulsion tooth 20 may correspond to the distance between two teeth 31 A2. It is essential, however, that a distance A1 between two propulsion teeth 20 is greater or smaller than the distance A2 between two teeth 31. Thus, A2<A1 or preferably A1>A2. In other words, it must be the case that A1≠A2.

Each propulsion tooth 20 further comprises a tooth base 22 with a contact surface 24. The tooth base 22 can have a constant cross section and corresponding surfaces along which it can slide linearly with minimal friction at the guide recess 45 during the cyclical stroke movement.

The drive shaft 10 and the propulsion teeth 20 are drivingly coupled to one another in such a manner that each propulsion tooth 20 performs at least one cyclical stroke movement 21 during one rotation of the drive shaft 10. The cyclical stroke movement 21 can be described, for example, as one complete period of a sine curve, each propulsion tooth 20 entering the rack 30 or a tooth space 32 once, fully exiting once, and returning to the initial position within one cyclical stroke movement 21. However, within the meaning of this invention, it is also possible for each propulsion tooth 20 to perform a plurality of cyclical stroke movements 21 during one rotation φ, as will be explained below.

Due to the guide means 12, which are rotated with respect to one another at an angle α about the longitudinal axis X, the cyclical stroke movement 21 of the respective propulsion teeth 20 takes place in a phase-shifted manner, as a result of which the propulsion teeth 20 enter and exit the relevant rack 30 at different angles of rotation of the drive shaft 10. In other words, the propulsion teeth 20 mesh with a tooth space 32 at different points in time in the case of a constant rotational speed of the drive shaft 10.

The guide means 12 have a contact surface 14 which forms the outer side facing the propulsion tooth 20. The contact surface 14 and the contact surface 24 of each propulsion tooth 20 slide off one another, with a force acting radially or as a secant being applied by the contact surface 14 to the particular propulsion tooth 20, which force causes the propulsion tooth 20 to be pushed through the guide recess 45 in the direction of the rack 30.

The mode of operation of the linear drive 1 is based on the fact that each propulsion tooth 20 comes into friction contact with a flank of one of the teeth 31 of the rack 30 when said propulsion tooth enters a tooth space 32 of the rack 30. When each propulsion tooth 20 enters, a first flank or one of the friction surfaces 26 comes into contact with the flank or the friction surface 36 of one of the teeth 31. Due to the wedge-shaped design, the two friction surfaces 26, 36 generate a propulsion which is directed in the longitudinal axis X and which causes the carriage 40 to slide in the space along the longitudinal axis X. As soon as one of the propulsion teeth 20 has fully entered the rack 30, a further propulsion tooth 20 arranged offset from the center of a further tooth space 32 follows in a phased-shifted manner. The further propulsion tooth 20 enters a further tooth space 32 and generates a propulsion. In the meantime, the propulsion tooth 20 that first fully entered the tooth space 32 exits the tooth space 32 either by spring action or by means of the contacting friction surfaces 26, 36. Further propulsion teeth 20 can follow in an offset or simultaneous manner, as a result of which a further propulsion can be generated.

In the present exemplary embodiment according to FIGS. 1-5, the guide means 12 are elliptical, as a result of which each propulsion tooth 20 passes through two complete cycles or periods during one rotation φ. Accordingly, each propulsion tooth 20 enters and exits the rack 30 twice during one rotation φ of the drive shaft 10. Due to the angular offset of 22.5° between two guide means 12 spaced apart in the longitudinal axis X, the phase shift Δφ based on one rotation φ of the longitudinal axis X is ⅟₃₂φ. In other words, the drive shaft 10 must be rotated by 11.25° so that, after a first propulsion tooth 20 enters, a second propulsion tooth 20 enters a further tooth space 32.

The linear drive 1 has at least two propulsion teeth 20, which, as shown in FIG. 6, can be arranged in a single row in parallel with the longitudinal axis X.

Figure 7:
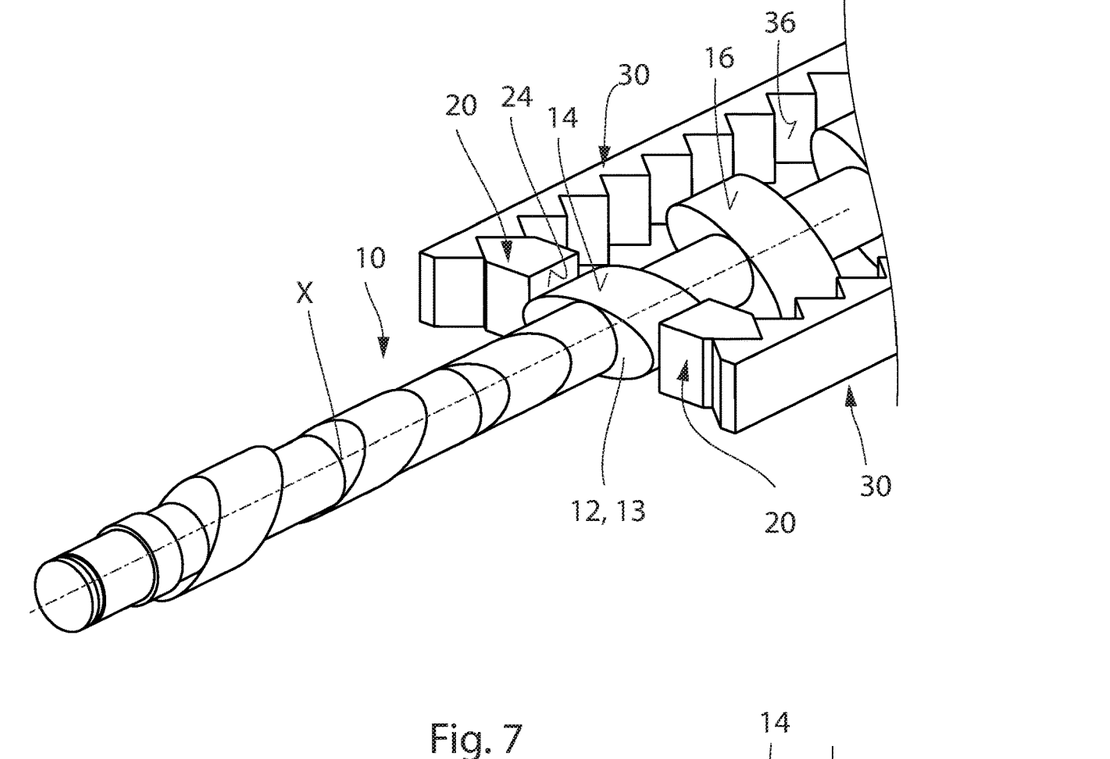
FIG. 7 shows a simplified representation of the drive shaft of the propulsion tooth and a rack according to FIG. 6, with one row of a propulsion tooth and a rack being arranged on each diametrical side of the drive shaft.

As has already been explained in connection with FIGS. 1-5, however, the propulsion teeth 20 can be arranged in two spaced apart rows according to FIG. 7, with one rack 30 being associated with each row of propulsion teeth 20. The two rows can be arranged as desired around the longitudinal axis X, but a circumferentially symmetrical arrangement is preferred.

Figure 8:
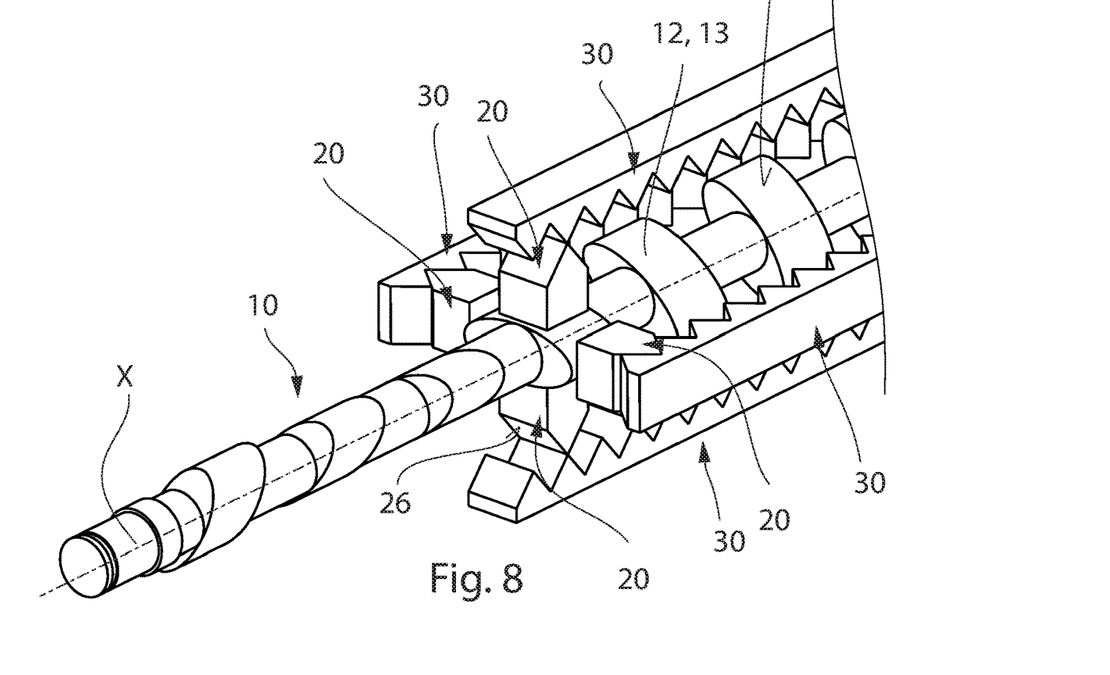
FIG. 8 shows a simplified representation of the drive shaft of the propulsion tooth and a rack according to FIG. 6 or 7, with four propulsion teeth being arranged in a plane circumferentially symmetrically around the drive shaft.

FIG. 8 shows a development of the linear drive 1, with four propulsion teeth 20 being arranged in a plane orthogonally or transversely to the longitudinal axis X, each of which can enter and exit a rack 30.

FIGS. 10a-10e show different cross sections of the guide means 12, a common feature of the guide means 12 being that the course of the radius measured with respect to the longitudinal axis X has at least a local minimum and a local maximum over the circumference. The elliptical cross section according to FIG. 10a has two maxima and two minima, as a result of which the propulsion teeth, which are in operative contact with the guide means 12 designed in this way, perform two cyclical stroke movements 21 during a rotation φ of the drive shaft 10, while the eccentric cross section according to FIG. 10b results in only one cyclical stroke movement 21 during a rotation φ of the drive shaft 10. The polygonal cross sections according to FIGS. 10c-10e have multiple corners, with the number of corners predetermining the number of cyclical stroke movements 21 during one rotation of the drive shaft 10.

Figure 11:
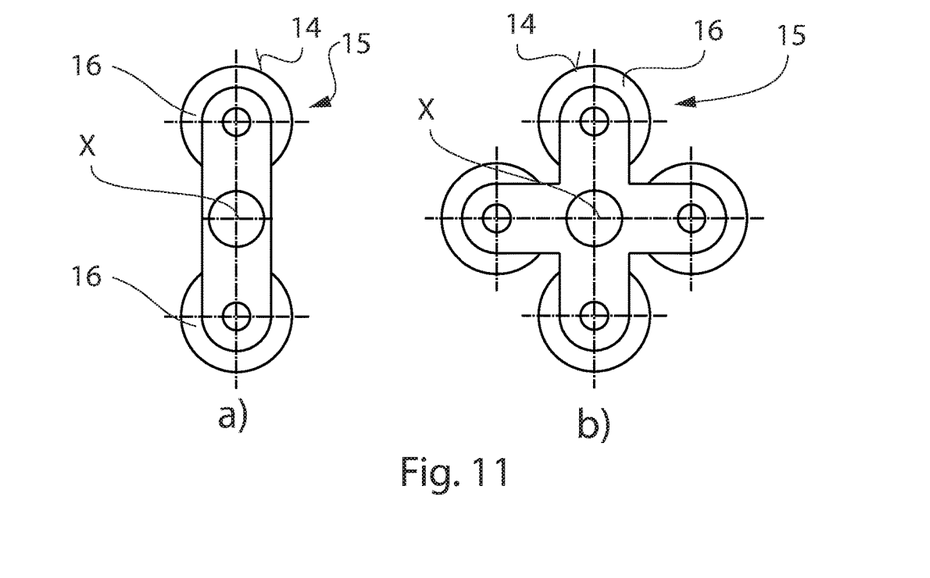
Figure 12:
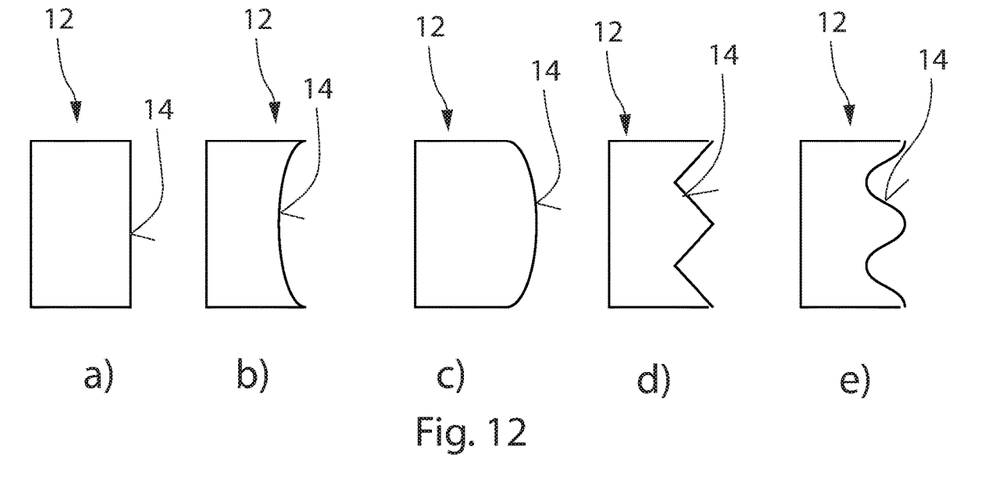

As an alternative to a camshaft having camshaft disks 13, the drive shaft 10 can have roller contacts 15 which are formed by contact rollers 16 arranged radially with respect to the longitudinal axis X. Each contact roller 16 forms the contact surface 14 which, in contrast to the cam disks, however, rolls off the contact surface 24 of the particular propulsion tooth 20. The roller contacts 15 can be designed as a double roller contact 15 according to FIG. 11a, or as a multiple roller contact 15, for example as a quadruple roller contact 15 according to FIG. 11b, it being possible to select the number of contact rollers 16 as desired.

FIGS. 12a-e show different configurations of the contact surfaces 14 of the guide means 12, it being possible for the contact surfaces according to FIGS. 12b-e to have a concave, convex, zigzag, or sinusoidal configuration, as a result of which a partial form fit can be brought about between the particular propulsion tooth 20 and the guide means 12, which allows an axial force in the longitudinal axis X to be transmitted from the propulsion tooth 20 to the drive shaft 10.

Figure 13:
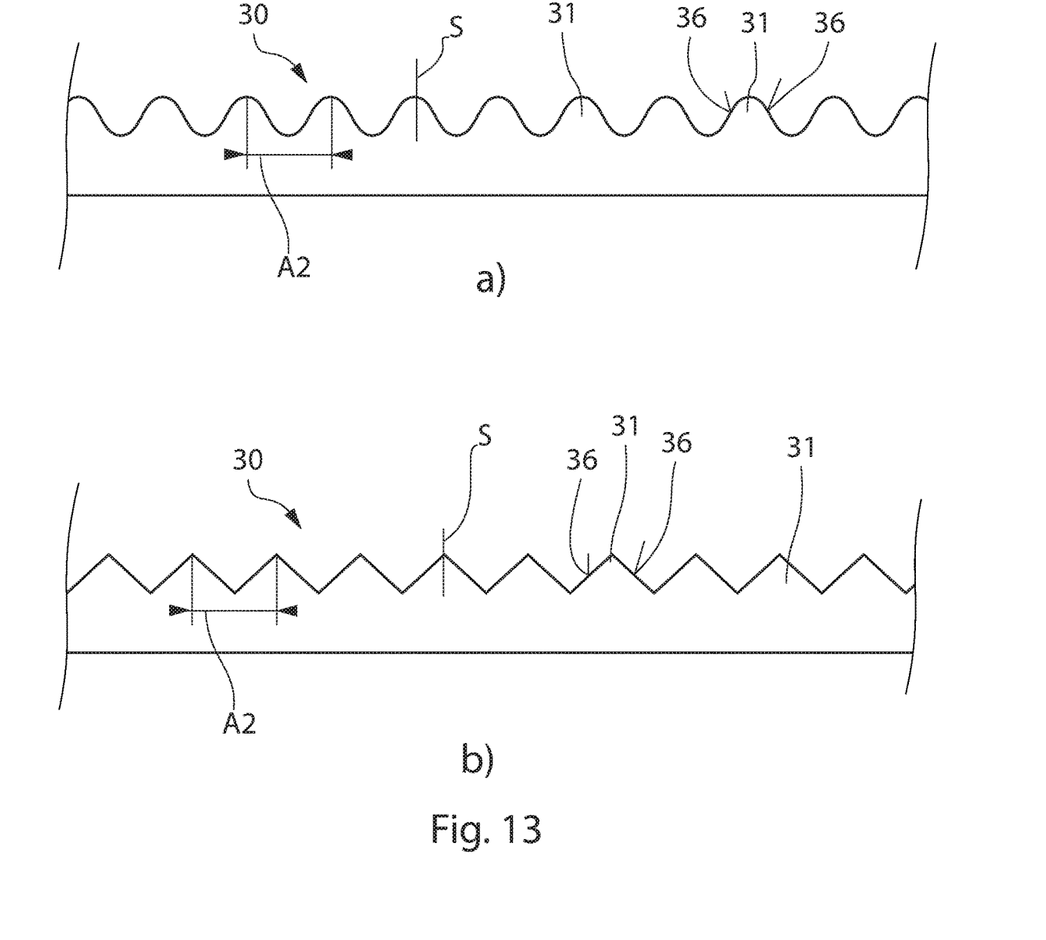

The teeth 31 of the rack 30 as well as the propulsion teeth 20 (not shown) can also have different tooth geometries. By way of example, in FIG. 13a, the teeth 31 are sinusoidal and, in FIG. 13b, they are zigzag-shaped with two flanks that are symmetrical about a line of symmetry S. In addition, either the teeth 31 or the propulsion teeth 20 can be rectangular and at least the teeth 31 of the rack 30 or the propulsion teeth 20 for generating a propulsion have a friction surface 26, 36 which is formed in the shape of a wedge in order to generate a propulsion.

As soon as a propulsion tooth 20 enters a tooth space 32, a form fit is brought about between the rack 30 and the carriage 40, as a result of which the carriage 50 is approximately free of play in the longitudinal axis X. The propulsion teeth 20 accordingly wedge the carriage 50 in the longitudinal axis X and the propulsion teeth 20 meshed with the rack 30 predetermine the breaking load, which can be set as desired by the number of propulsion teeth 20 in a row as well as by the number of rows.

LIST OF REFERENCE NUMERALS

1 Drive device
2 Longitudinal adjustment unit
3 Motor vehicle
10 Drive shaft
12 Guide means
13 Camshaft disk
14 Contact surface
15 Roller contact
16 Contact roller
19 Coupling
20 Propulsion tooth
21 Stroke movement
22 Tooth base
24 Contact surface 26 Friction surface
30 Rack
31 Tooth
32 Tooth space
35 Rack housing
36 Friction surface
38 Space
40 Carriage
41 First end region
42 Second end region
43 Housing part
44 Housing part
45 Guide recess for 20
48 Bearing
50 Drive
55 Transmission
A1 Distance between two propulsion teeth 20
A2 Distance between two teeth 31
S Line of symmetry
X Longitudinal axis
$\varphi$ Rotation
$\Delta\varphi$ Phase shift

The invention claimed is:

1. A linear drive (1), comprising
a drive shaft (10) arranged along a longitudinal axis (X), at least two propulsion teeth (20), and
at least one rack (30) having a plurality of teeth (31),
wherein the propulsion teeth (20) can move in a stroke transversely to the longitudinal axis (X) and are drivingly coupled to the drive shaft (10) in such a manner that the at least two propulsion teeth (20) perform at least one cyclical stroke movement (21) in the course of one rotation ($\varphi$) of the drive shaft (10) and enter and exit the at least one rack (30) to generate a propulsion in the longitudinal axis (X), and
wherein the cyclical stroke movement (21) of the at least two propulsion teeth (20) takes place with a phase shift ($\Delta\varphi$).

2. The linear drive (1) according to claim 1, characterized in that the at least two propulsion teeth (20) are arranged at a first distance (A1) in the longitudinal axis (X), and in that the teeth (31) are arranged at a second distance (A2) along the longitudinal axis (X), where the following applies:
A1<A2 or A1>A2.

3. The linear drive (1) according to claim 1, characterized in that each propulsion tooth (20) and/or the tooth (31) of the rack (30) are or is rectangular, wedge-shaped, involuted, or sinusoidal.

4. The linear drive (1) according to claim 1, characterized in that each propulsion tooth (20) and/or the tooth (31) are or is symmetrical.

5. The linear drive (1) according to claim 1, characterized in that the at least two propulsion teeth (20) and the teeth (31) have a corresponding geometry.

6. The linear drive (1) according to claim 1, characterized in that, for the phase shift ($\Delta\varphi$) of the cyclical stroke movement (21) of the at least two propulsion teeth (20) in relation to a rotation ($\varphi$) of the drive shaft (10), the following applies: $\frac{1}{256}\varphi \leq \Delta\varphi \leq \frac{1}{2}\varphi$.

7. The linear drive (1) according to claim 1, characterized in that the drive shaft (10) is designed as a crankshaft or camshaft and has at least one guide means (12) which predetermines the cyclical stroke movement (21) during the rotation ($\varphi$) of the drive shaft (10).

8. The linear drive (1) according to claim 7, characterized in that the at least one guide means (12) has a contact surface (14), and in that the contact surface has a flat, concave, convex, or sinusoidal course in the longitudinal axis.

9. The linear drive (1) according to claim 7, characterized in that the at least one guide means (12) comprises a camshaft disk (13) which is designed as an eccentric, ellipse, polygon, tetragon, pentagon, or hexagon in cross section.

10. The linear drive (1) according to claim 1, characterized in that each propulsion tooth (20) is pressed against the drive shaft (10) by spring action and/or is drivingly coupled to the drive shaft (10) by means of a connecting rod.

11. The linear drive (1) according to claim 1, characterized in that each propulsion tooth (20) is drivingly coupled to the drive shaft (10) via a sliding contact or a single or multiple roller contact (15).

12. The linear drive (1) according to claim 1, characterized in that the at least two propulsion teeth (20) are arranged in a row along an axis parallel to the longitudinal axis (X).

13. The linear drive (1) according to claim 12, characterized in that at least two rows of propulsion teeth and at least two racks (30) are arranged around the longitudinal axis (X).

14. The linear drive (1) according to claim 12, characterized in that the at least two rows and the at least two racks are arranged circumferentially symmetrically around the longitudinal axis (X).

15. The linear drive (1) according to claim 1, characterized in that a carriage (40) is provided, and in that the drive shaft (10) is provided in the carriage and the at least two propulsion teeth are held so as to be mounted.

16. The linear drive (1) according to claim 1, characterized in that a drive (50) is provided, wherein the drive (50) drives the drive shaft (10).

17. The linear drive (1) according to claim 16, characterized in that a transmission (55), in particular a planetary gearset, is arranged between the drive (50) and the drive shaft (10).

18. A longitudinal adjustment unit (2) having a linear drive (1) according to claim 1.

19. A motor vehicle (3) having a linear drive (1) according to claim 1.

* * * * *